(12) United States Patent
Morio et al.

(10) Patent No.: US 11,519,488 B2
(45) Date of Patent: Dec. 6, 2022

(54) RESIN-MADE GEAR

(71) Applicant: Showa Denko Materials Co., Ltd., Tokyo (JP)

(72) Inventors: Yoichi Morio, Tokyo (JP); Tatsuya Aoyagi, Tokyo (JP)

(*) Notice: Subject to any disclaimer, the term of this patent is extended or adjusted under 35 U.S.C. 154(b) by 148 days.

(21) Appl. No.: 16/972,609

(22) PCT Filed: Jun. 12, 2018

(86) PCT No.: PCT/JP2018/022411
§ 371 (c)(1),
(2) Date: Dec. 7, 2020

(87) PCT Pub. No.: WO2019/239483
PCT Pub. Date: Dec. 19, 2019

(65) Prior Publication Data
US 2021/0231205 A1  Jul. 29, 2021

(51) Int. Cl.
*F16H 55/06* (2006.01)
*F16H 55/14* (2006.01)
*F16H 55/17* (2006.01)

(52) U.S. Cl.
CPC ............. *F16H 55/06* (2013.01); *F16H 55/14* (2013.01); *F16H 55/17* (2013.01)

(58) Field of Classification Search
CPC .................................. F16H 55/06; F16H 55/17
See application file for complete search history.

(56) References Cited

U.S. PATENT DOCUMENTS

| | | | |
|---|---|---|---|
| 3,257,860 A | 6/1966 | Runde et al. | |
| 3,901,162 A * | 8/1975 | Bertin | B61B 13/02 |
| | | | 104/287 |
| 2015/0226303 A1 | 8/2015 | Dumanski | |
| 2021/0231204 A1* | 7/2021 | Morio | F16H 55/06 |
| 2021/0231206 A1* | 7/2021 | Morio | F16H 55/17 |

FOREIGN PATENT DOCUMENTS

| | | |
|---|---|---|
| EP | 2781791 | 9/2014 |
| JP | S60-028652 | 2/1985 |
| JP | H6-018984 | 3/1994 |
| JP | 2007-270878 | 10/2007 |
| JP | 2017-015100 | 1/2017 |
| JP | 2017-115969 | 6/2017 |
| WO | 94/018476 | 8/1994 |

OTHER PUBLICATIONS

International Preliminary Report on Patentability with Written Opinion dated Dec. 24, 2020 for PCT/JP2018/022411.
Extended Search Report in corresponding European Application No. 18922851.3, dated Apr. 19, 2021.
International Search Report dated Aug. 21, 2018 for PCT/JP2018/022411.

* cited by examiner

*Primary Examiner* — Terence Boes
(74) *Attorney, Agent, or Firm* — Soei Patent & Law Firm

(57) ABSTRACT

A resin gear includes an annular metal bush, an annular resin member provided around the metal bush and having a tooth profile formed in an outer peripheral portion, and an elastic member provided between the metal bush and the resin member. The elastic member has a first overhanging portion overhanging one end surface of the metal bush and one end surface of the resin member outward in an axial direction of the resin gear.

10 Claims, 5 Drawing Sheets

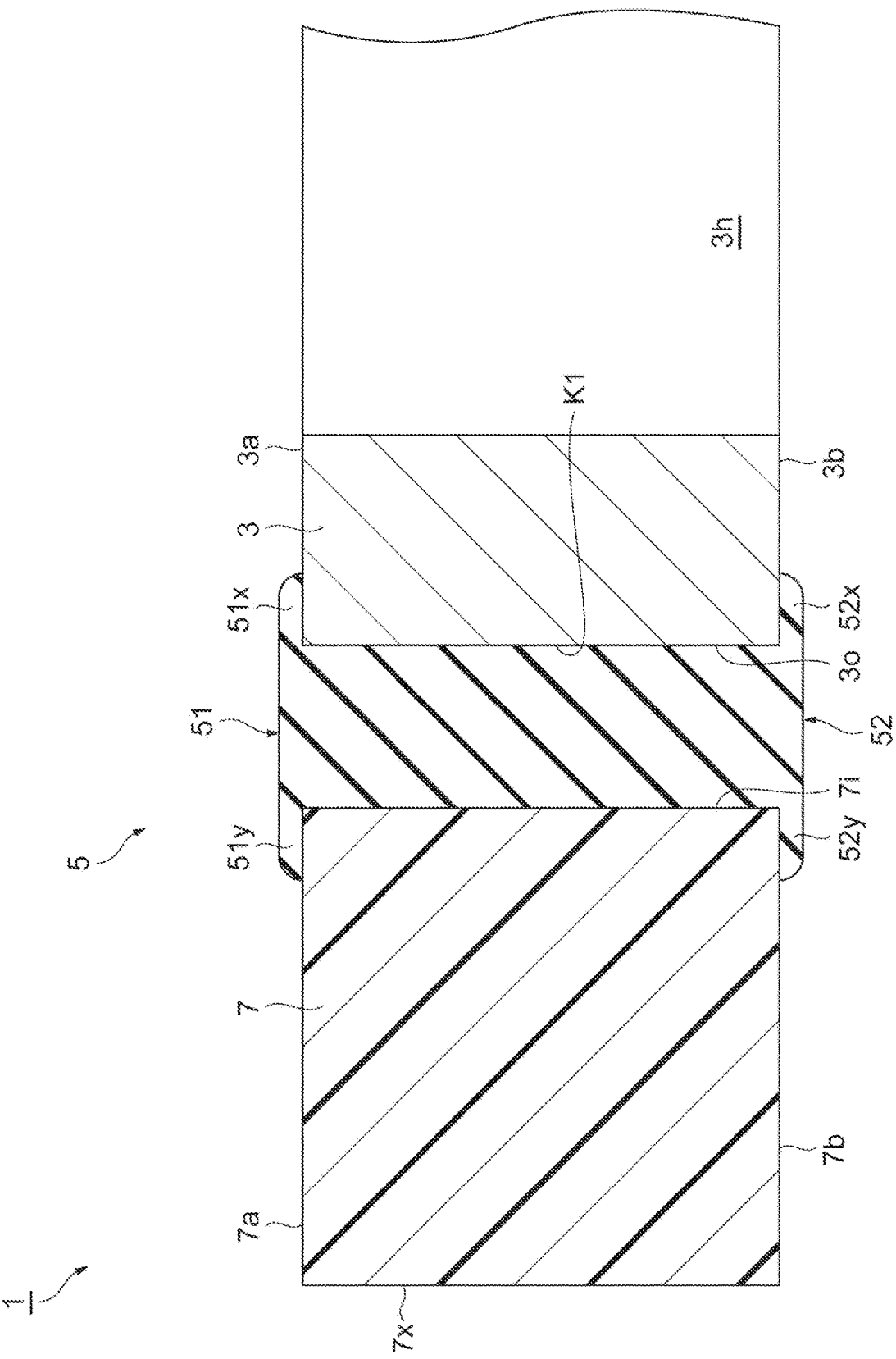

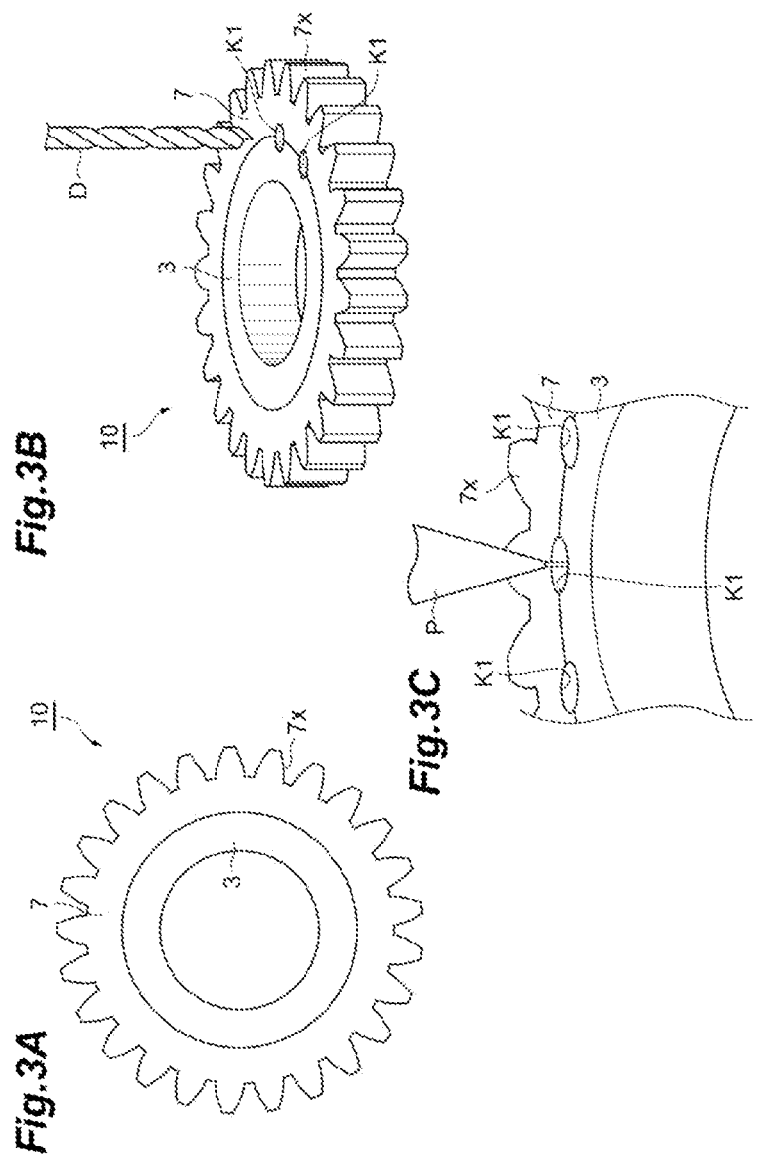

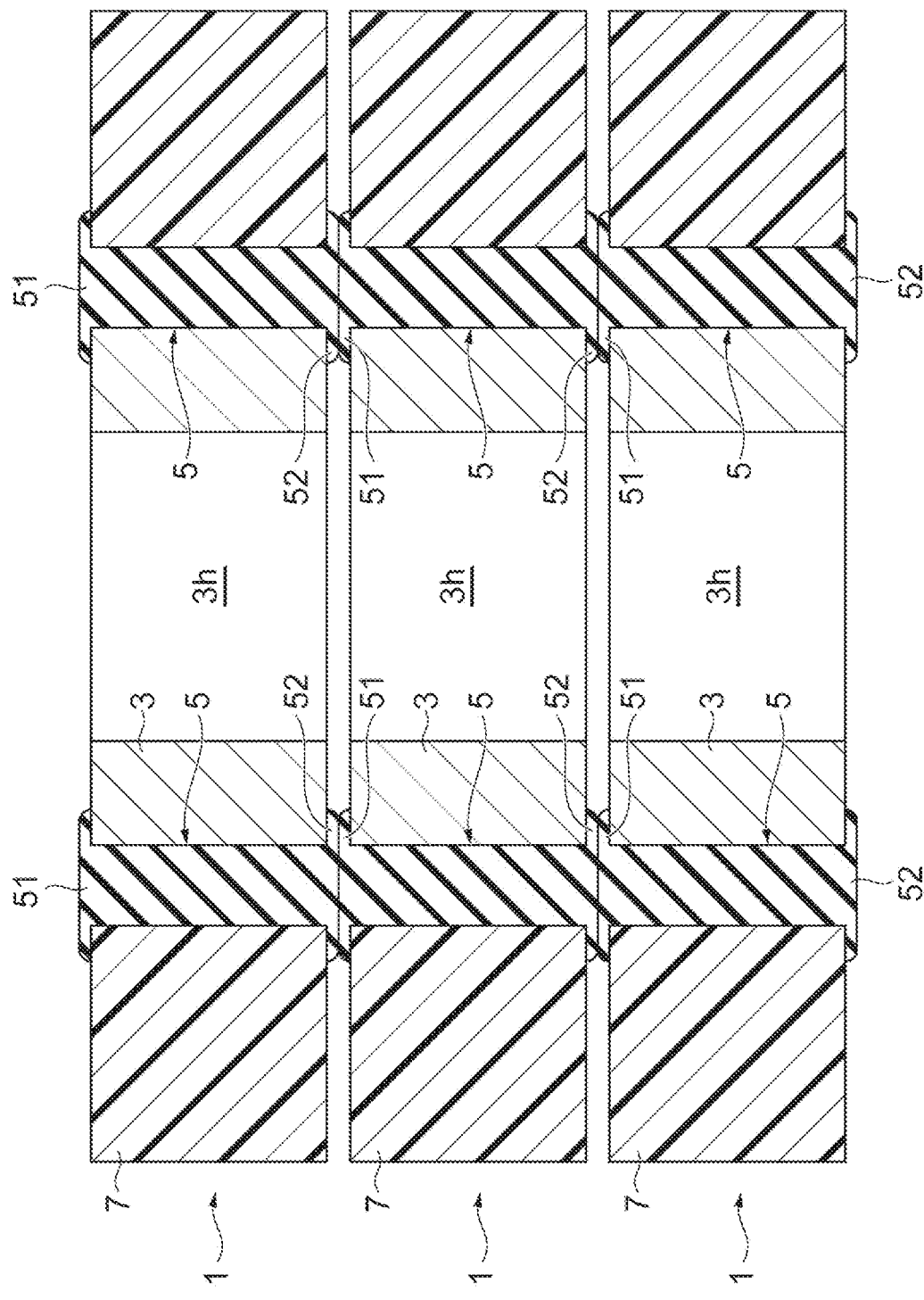

RESIN-MADE GEAR

CROSS-REFERENCE TO RELATED APPLICATIONS

This application is a 35 U.S.C. § 371 national phase application of PCT/JP2018/022411, filed on Jun. 12, 2018.

TECHNICAL FIELD

One aspect of the present invention relates to a resin gear.

BACKGROUND ART

Resin gears are lightweight, excellent in quietness, and widely used as, for example, vehicular or industrial gears. A resin gear including a metal bush, a resin member provided around the metal bush and having a tooth profile formed in an outer peripheral portion, and an elastic member provided between the metal bush and the resin member is known as a resin gear (see, for example, Patent Literature 1).

CITATION LIST

Patent Literature

Patent Literature 1: Japanese Unexamined Patent Publication No. 2017-151000

SUMMARY OF INVENTION

Technical Problem

In the related art described above, the resin gear may interfere with another surrounding component and generate an interference sound during, for example, storage at the time of conveyance or keeping.

An object of one aspect of the present invention is to provide a resin gear that is capable of suppressing an interference sound during storage.

Solution to Problem

A resin gear according to one aspect of the present invention is a resin gear including an annular metal bush, an annular resin member provided around the metal bush and having a tooth profile formed in an outer peripheral portion, and an elastic member provided between the metal bush and the resin member, in which the elastic member has a first overhanging portion overhanging at least one of one end surface of the metal bush and one end surface of the resin member outward in an axial direction of the resin gear.

In this resin gear, the elastic member has the first overhanging portion. As a result, even if the resin gear interferes with the surroundings during storage, the first overhanging portion (that is, the elastic member) easily interferes with the surroundings to the extent of the overhanging of the first overhanging portion. As a result, it is possible to suppress an interference sound during the storage.

In the resin gear according to one aspect of the present invention, the first overhanging portion may have at least one of a first contact portion coming into contact with one end surface of the metal bush and a second contact portion coming into contact with one end surface of the resin member. As a result, the first overhanging portion is more likely to interfere with the surroundings and it is possible to further suppress an interference sound during the storage.

In the resin gear according to one aspect of the present invention, the elastic member may have a second overhanging portion overhanging at least one of the other end surface of the metal bush and the other end surface of the resin member outward in the axial direction of the resin gear. As a result, even if the resin gear interferes with the surroundings during the storage, the second overhanging portion easily interferes with the surroundings to the extent of the overhanging of the second overhanging portion. In other words, even if the resin gear interferes with the surroundings during the storage, the elastic member is more likely to interfere with the surroundings. As a result, it is possible to further suppress an interference sound during the storage.

In the resin gear according to one aspect of the present invention, the second overhanging portion may have at least one of a third contact portion coming into contact with the other end surface of the metal bush and a fourth contact portion coming into contact with the other end surface of the resin member. As a result, the second overhanging portion is more likely to interfere with the surroundings and it is possible to further suppress an interference sound during the storage.

In the resin gear according to one aspect of the present invention, a hole provided between the metal bush and the resin member and penetrating the resin gear in the axial direction of the resin gear may be filled with the elastic member. In this case, the elastic member can be easily provided between the metal bush and the resin member by injection molding.

Advantageous Effects of Invention

According to one aspect of the present invention, it is possible to provide a resin gear that is capable of suppressing an interference sound during storage.

BRIEF DESCRIPTION OF DRAWINGS

FIG. 2 is a cross-sectional view taken along line II-II of FIG. 1.

FIG. 3A is a diagram illustrating a resin gear manufacturing method. FIG. 3B is a diagram illustrating a continuation of FIG. 3A. FIG. 3C is a diagram illustrating a continuation of FIG. 3B.

FIG. 4 is a cross-sectional view illustrating an example of storing a plurality of the resin gears.

DESCRIPTION OF EMBODIMENTS

Hereinafter, an embodiment will be described in detail with reference to the accompanying drawings. In the description of the drawings, the same or corresponding elements will be denoted by the same reference symbols without redundant description.

Figure 1:
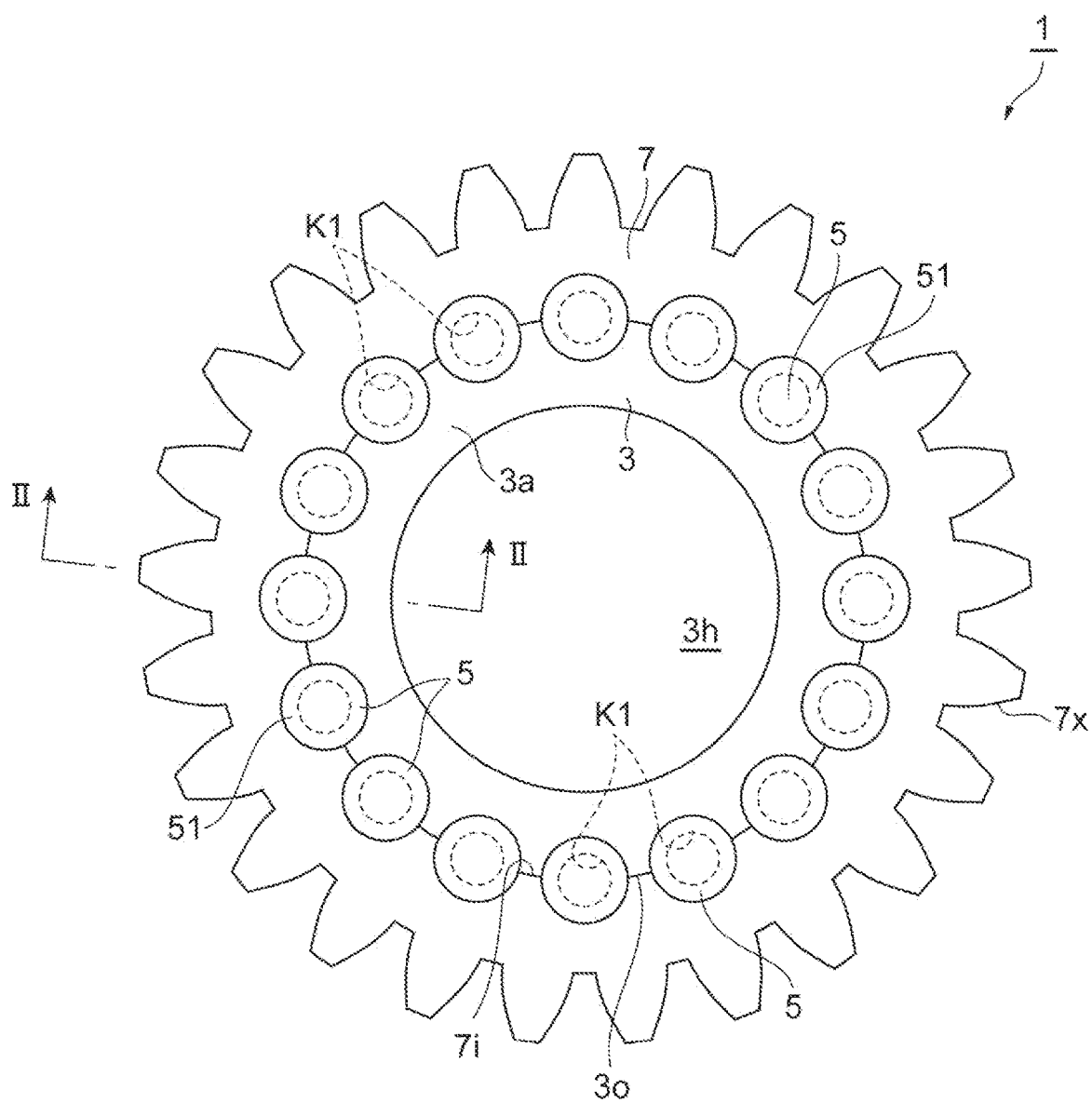
FIG. 1 is a front view of a resin gear according to one embodiment.

As illustrated in FIGS. 1 and 2, a resin gear 1 is a so-called high-strength resin gear and is used as a vehicular or industrial gear. For example, the resin gear 1 can be used as a balance shaft gear, a camshaft gear, or the like in an engine. The resin gear 1 includes a metal bush 3 and a resin member 7. The resin gear 1 is a spur gear.

The metal bush 3 is a member attached to, for example, a rotary shaft (not illustrated). The metal bush 3 has a circular ring shape. The metal bush 3 is formed of a metal such as stainless steel. The metal bush 3 is provided with a through hole 3h into which the rotary shaft is inserted.

The resin member 7 is a member meshing with another gear. The resin member 7 has an annular shape. The resin member 7 is formed of resin. The resin member 7 is provided around the metal bush 3. A tooth profile 7x is formed in the outer peripheral portion of the resin member 7. A plurality of the tooth profiles 7x are formed at predetermined intervals in the circumferential direction of the resin member 7. It should be noted that provision around an elastic member 5 includes not only being provided in direct contact around the elastic member 5 but also being provided via another member around the elastic member 5.

The metal bush 3 and the resin member 7 are disposed so as to be relatively rotatable in the direction of rotation of the resin gear 1 (hereinafter, also simply referred to as "direction of rotation"). Specifically, the metal bush 3 and the resin member 7 abut against each other so as to be slidable in the direction of rotation. More specifically, the outer diameter of the metal bush 3 and the inner diameter of the resin member 7 are equal to each other, an outer peripheral surface 3o of the metal bush 3 and an inner peripheral surface 7i of the resin member 7 are not bonded to each other, and the outer peripheral surface 3o and the inner peripheral surface 7i are in contact with each other in a relatively rotatable state.

A plurality of spaces K1 entering the outer peripheral surface 3o of the metal bush and the inner peripheral surface 7i of the resin member 7 are formed, so as to be aligned along the direction of rotation, between the metal bush 3 and the resin member 7. The space K1 is a hole penetrating the resin gear 1 along the axial direction of the resin gear 1 (hereinafter, also simply referred to as "axial direction"). When viewed from the axial direction, the spaces K1 are arranged at equal intervals along the direction of rotation. The space K1 has a columnar shape having the axial direction as the height direction of the space K1. The space K1 is defined by the U groove that is formed on the outer peripheral surface 3o and the U groove that is formed on the inner peripheral surface 7i of the resin member 7. In the radial direction of the resin gear 1 (hereinafter, also simply referred to as "radial direction"), the inside half of the space K1 enters the metal bush 3 side and the outside half of the space K1 enters the resin member 7 side.

The elastic member 5 is disposed in the space K1. The elastic member 5 has a shape corresponding to the shape of the space K1. Specifically, the elastic member 5 has a columnar shape coaxial with and equal in diameter to the space K1 with the axial direction being the height direction of the elastic member 5. The outer peripheral surface of the elastic member 5 abuts against the inner surface of the space K1. At least a part of the elastic member 5 is bonded to the inner surface of the space K1. The elastic member 5 is provided so as to come into contact with the inner surface of the space K1 via an adhesive. It should be noted that the elastic member 5 does not have to be bonded to the inner surface of the space K1 and, in this case, the cost of the resin gear 1 can be reduced.

The elastic member 5 is formed of rubber. The rubber is butadiene rubber, chloroprene rubber, butyl rubber, styrene butadiene rubber, nitrile rubber, ethylene propylene rubber, acrylic rubber, fluororubber, epichlorohydrin rubber, silicone rubber, or the like. From the viewpoint of durability and heat resistance, the rubber is preferably fluororubber or silicone rubber. The elastic member 5 may be configured by a plurality of members (rubber layers) being stacked.

The elastic member 5 absorbs and damps the impact that is generated by the resin gear 1 meshing with another gear by being elastically deformed. Specifically, in a case where an impact is applied to the resin gear 1 as a result of meshing with another gear, the resin member 7 tends to rotate relative to the metal bush 3 in the direction of rotation. At this time, a pair of forces (shearing forces) in opposite directions are generated on the resin member 7 side and the metal bush 3 side in the elastic member 5 disposed in the space K1, the elastic member 5 is elastically deformed, and the elastic member 5 acts as a detent against the relative rotation. As a result, in a case where an impact is applied as a result of meshing with another gear, the impact is sufficiently absorbed and damped by such elastic deformation. Accordingly, the damper effect of the elastic member 5 can be sufficiently obtained.

In the resin gear 1 of the present embodiment, the elastic member 5 has a first overhanging portion 51 overhanging one end surface 3a of the metal bush 3 and one end surface 7a of the resin member 7 outward in the axial direction. The end surfaces 3a and 7a are end surfaces on one side in the axial direction and have a planar shape orthogonal to the axial direction. The end surfaces 3a and 7a are positioned on the same plane and are flush with each other (with no step in the axial direction).

The first overhanging portion 51 protrudes outward in the axial direction (to one side in the axial direction) from the end surfaces 3a and 7a. The first overhanging portion 51 is provided so as to swell or bulge outward in the axial direction from the end surfaces 3a and 7a. The first overhanging portion 51 can be configured by means of the burr that is produced during manufacturing. When viewed from the axial direction, the first overhanging portion 51 has a circular shape along the outer edge of the space K1 as a circular hole. The first overhanging portion 51 is provided so as to include the space K1 when viewed from the axial direction. The first overhanging portion 51 partially covers the metal bush 3 and the resin member 7 when viewed from the axial direction. The first overhanging portion 51 includes a first contact portion 51x coming into contact with the one end surface 3a of the metal bush 3 and a second contact portion 51y coming into contact with the one end surface 7a of the resin member 7.

The elastic member 5 has a second overhanging portion 52 overhanging the other end surface 3b of the metal bush 3 and the other end surface 7b of the resin member 7 outward in the axial direction. The other end surfaces 3b and 7b are end surfaces on the other side in the axial direction (opposite to the end surfaces 3a and 7a) and have a planar shape orthogonal to the axial direction. The other end surfaces 3b and 7b are positioned on the same plane and are flush with each other.

The second overhanging portion 52 protrudes outward in the axial direction (to the other side in the axial direction) from the other end surfaces 3b and 7b. The second overhanging portion 52 is provided so as to swell or bulge outward in the axial direction from the other end surfaces 3b and 7b. The second overhanging portion 52 can be configured by means of the burr that is produced during manufacturing. When viewed from the axial direction, the second overhanging portion 52 has a circular shape along the outer edge of the space K1 as a circular hole. The second overhanging portion 52 is provided so as to include the space K1 when viewed from the axial direction. The second overhanging portion 52 partially covers the metal bush 3 and the resin member 7 when viewed from the axial direction. The second overhanging portion 52 includes a third contact portion 52x coming into contact with the other end surface 3b of the metal bush 3 and a fourth contact portion 52y coming into contact with the other end surface 7b of the resin member 7.

In a case where the resin gear 1 described above is manufactured, an intermediate body 10 including the metal bush 3 and the resin member 7 illustrated in FIG. 3A is formed first by a known method. As illustrated in FIG. 3B, processing by means of a cutting tool (drilling by means of a drill D in the drawing) is performed on the intermediate body 10 and the plurality of spaces K1 are formed in the intermediate body 10. After an adhesive is applied in advance to the inner surface of the space K1, rubber is injected into the space K1 via a pin gate P as illustrated in FIG. 3C, the space K1 is filled with the rubber, and the elastic member 5 is molded in the space K1. Then, necessary processing is performed and the resin gear 1 is manufactured as a result. It should be noted that methods for manufacturing the resin gear 1 are not particularly limited and various methods can be used.

In the resin gear 1, the elastic member 5 has the first overhanging portion 51 as described above. As a result, even if the resin gear 1 interferes with the surroundings during, for example, the storage at the time of conveyance (transport), keeping, or packing of the resin gear 1 or a plurality of the resin gears 1 (hereinafter, simply referred to as "storage"), the first overhanging portion 51 (that is, the elastic member 5) easily interferes with the surroundings to the extent of the overhanging of the first overhanging portion 51 as compared with a case where the elastic member 5 does not overhang the one end surface 3a of the metal bush 3 and the one end surface 7a of the resin member 7. As a result, during the storage, it is possible to, for example, suppress interference with the surroundings of the metal bush 3 and suppress an interference sound such as a rattling sound (clatter).

In the resin gear 1, the elastic member 5 has the second overhanging portion 52. As a result, even if the resin gear 1 interferes with the surroundings during the storage, the second overhanging portion 52 easily interferes with the surroundings to the extent of the overhanging of the second overhanging portion 52 as compared with a case where the elastic member 5 does not overhang the other end surface 3b of the metal bush 3 and the other end surface 7b of the resin member 7. In other words, even if the resin gear 1 interferes with the surroundings during the storage, the elastic member 5 is more likely to interfere with the surroundings. As a result, during the storage, it is possible to, for example, further suppress interference with the surroundings of the metal bush 3 and further suppress an interference sound such as a rattling sound.

In a case where the plurality of resin gears 1 are stacked in the axial direction and stored as illustrated in FIG. 4, for example, at least one of the first overhanging portion 51 and the second overhanging portion 52 serves as a cushioning material, no slip is likely to occur even in the event of vibration, and load collapse can be prevented. The metal bush 3 and the resin member 7 are unlikely to be damaged, and gear damage can be prevented. Catching with fingers is easy during carrying by hand.

In the resin gear 1, the first overhanging portion 51 has the first contact portion 51x coming into contact with the one end surface 3a of the metal bush 3 and the second contact portion 51y coming into contact with the one end surface 7a of the resin member 7. As a result, the first overhanging portion 51 is more likely to interfere with the surroundings and it is possible to further suppress an interference sound during the storage.

In the resin gear 1, the second overhanging portion 52 has the third contact portion 52x coming into contact with the other end surface 3b of the metal bush 3 and the fourth contact portion 53y coming into contact with the other end surface 7b of the resin member 7. As a result, the second overhanging portion 52 is more likely to interfere with the surroundings and it is possible to further suppress an interference sound during the storage.

It should be noted that the elastic member 5 has the first to fourth contact portions 51x, 51y, 52x, and 52y in the resin gear 1 and thus it is possible to extend the oil infiltration path between the elastic member 5 and the metal bush 3 and the resin member 7 to the extent that the first to fourth contact portions 51x, 51y, 52x, and 52y come into contact with the metal bush 3 and the resin member 7 under oil lubrication, that is, lubrication by means of oil. Even if oil infiltration proceeds, the oil infiltration is unlikely to proceed to the point of the damper effect being adversely affected by the deterioration of the elastic member 5 and the damper effect can be maintained.

In the resin gear 1, the space K1 as a hole provided between the metal bush 3 and the resin member 7 is filled with the elastic member 5. In this case, the elastic member 5 can be easily provided between the metal bush 3 and the resin member 7 by injection molding.

Although an embodiment of the present invention has been described above, the present invention is not limited to the embodiment described above.

Figure 5A:
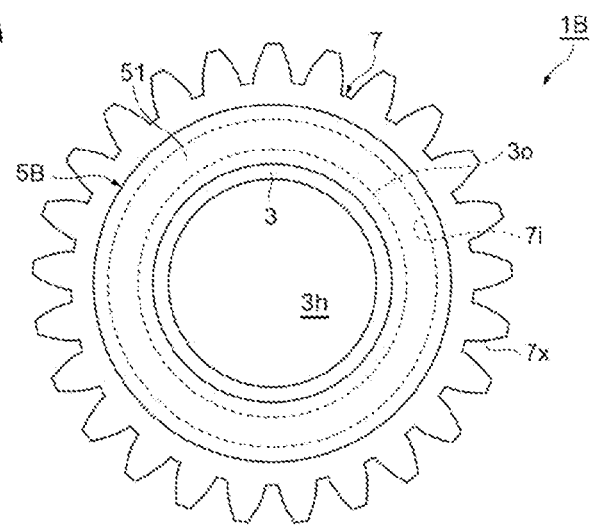
FIG. 5A is a front view illustrating a resin gear according to a modification example.

Although a plurality of the elastic members 5 are arranged between the metal bush 3 and the resin member 7 so as to be aligned along the direction of rotation in the embodiment described above, the present invention is not limited thereto insofar as the elastic member 5 is provided between the metal bush 3 and the resin member 7. As an example, an annular elastic member 5B may be provided between the metal bush 3 and the resin member 7 as in a resin gear 1B illustrated in FIG. 5A. The elastic member 5B abuts against the outer peripheral surface 3o of the metal bush 3 and abuts against the inner peripheral surface 7i of the resin member 7. The elastic member 5B has the first overhanging portion 51 and a second overhanging portion (not illustrated).

Figure 5B:
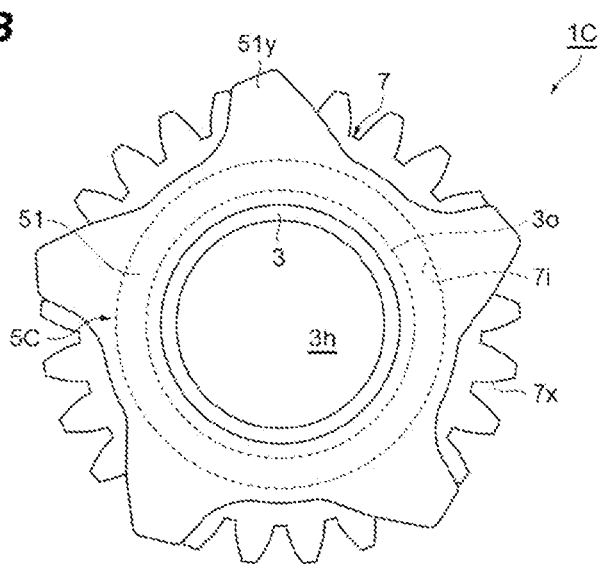
FIG. 5B is a front view illustrating a resin gear according to another modification example.

Alternatively, as another example, an annular elastic member 5C may be provided between the metal bush 3 and the resin member 7 as in a resin gear 1C illustrated in FIG. 5B. The elastic member 5C abuts against the outer peripheral surface 3o of the metal bush 3 and abuts against the inner peripheral surface 7i of the resin member 7. The elastic member 5C has the first overhanging portion 51 and a second overhanging portion (not illustrated). In the elastic member 5C, a part of the second contact portion 51y of the first overhanging portion 51 extends to reach the tip (tooth tip) of the tooth profile 7x. As a result, particularly in the elastic member 5C, it is possible to prevent the tooth tip from interfering with the surroundings during the storage.

Although the first overhanging portion 51 in the embodiment described above overhangs both the one end surface 3a and the one end surface 7a outward in the axial direction, the first overhanging portion 51 may overhang either the one end surface 3a or the one end surface 7a outward in the axial direction in a case where, for example, the end surfaces 3a and 7a are not flush with each other. Likewise, although the second overhanging portion 52 in the embodiment described above overhangs both the other end surface 3b and the other end surface 7b outward in the axial direction, the second overhanging portion 52 may overhang either the other end surface 3b or the other end surface 7b outward in the axial direction in a case where, for example, the other end surfaces 3b and 7b are not flush with each other.

Although the elastic member 5 has both the first overhanging portion 51 and the second overhanging portion 52 in the embodiment described above, the elastic member 5 may not have the second overhanging portion 52. Although the elastic member 5 has the first contact portion 51x, the third contact portion 52x, the second contact portion 51y, and the fourth contact portion 52y in the embodiment described above, the elastic member 5 may have at least one of the first contact portion 51x, the third contact portion 52x, the second contact portion 51y, and the fourth contact portion 52y. In addition, the elastic member 5 may have none of the first contact portion 51x, the third contact portion 52x, the second contact portion 51y, and the fourth contact portion 52y. Although the first overhanging portion 51 and the second overhanging portion 52 in the embodiment described above partially cover the metal bush 3 and the resin member 7 when viewed from the axial direction, the first overhanging portion 51 and the second overhanging portion 52 may entirely cover at least one of the metal bush 3 and the resin member 7.

Although a form in which the resin gear 1 is a spur gear has been described as an example in the embodiment described above, the resin gear 1 may be a helical gear or the like. In the embodiment described above, an adhesive may be interposed between the metal bush 3 and the resin member 7. The metal bush 3 and the resin member 7 may be fixed.

In the present invention, the configurations of the above-described embodiment and modification examples may be appropriately combined. The present invention can be variously modified within the gist thereof.

REFERENCE SIGNS LIST 1, 1B, 1C: resin gear, 3: metal bush, 3a: one end surface, 3b: other end surface, 3o: outer peripheral surface, 5, 5B, 5C: elastic member, 7: resin member, 7a: one end surface, 7b: other end surface, 7i: inner peripheral surface, 7x: tooth profile, 51: first overhanging portion, 51x: first contact portion, 51y: second contact portion, 52: second overhanging portion, 52x: third contact portion, 52y: fourth contact portion, K1: space (hole).

The invention claimed is:

1. A resin gear comprising:
an annular metal bush;
an annular resin member which is provided around the metal bush and comprising a tooth profile formed in an outer peripheral portion; and
a plurality of elastic members provided between the metal bush and the resin member,
wherein at least one elastic member of the plurality of elastic members comprises a first overhanging portion which is overhanging at least one of one end surface of the metal bush and one end surface of the resin member outward in an axial direction of the resin gear, and
wherein the plurality of elastic members are arranged between the metal bush and the resin member so as to be aligned along the direction of rotation when viewed from the axial direction.

2. The resin gear according to claim 1,
wherein the first overhanging portion comprises at least one of a first contact portion contacting the one end surface of the metal bush and a second contact portion contacting the one end surface of the resin member.

3. The resin gear according to claim 1,
wherein the at least one elastic member of the plurality of elastic members comprises a second overhanging portion overhanging at least one of the other end surface of the metal bush and the other end surface of the resin member outward in the axial direction of the resin gear.

4. The resin gear according to claim 3,
wherein the second overhanging portion comprises at least one of a third contact portion contacting the other end surface of the metal bush and a fourth contact portion contacting the other end surface of the resin member.

5. The resin gear according to claim 1,
wherein a plurality of holes provided between the metal bush and the resin member and penetrating the resin gear in the axial direction are filled with the plurality of elastic members.

6. The resin gear according to claim 5,
wherein the first overhanging portion forms a shape along an outer edge of at least one hole of the plurality of holes when viewed from the axial direction.

7. The resin gear according to claim 1,
wherein the first overhanging portion partially covers the metal bush and the resin member when viewed from the axial direction.

8. The resin gear according to claim 5,
wherein the plurality of the holes are arranged at a substantially equal interval along a direction of rotation of the resin gear when viewed from the axial direction.

9. The resin gear according to claim 5,
wherein an inside half of at least one hole of the plurality of holes in a radial direction of the resin gear enters towards the metal bush, and
wherein an outside half of the at least one hole of the plurality of holes in the radial direction of the resin gear enters towards the resin member.

10. The resin gear according to claim 1,
wherein an outer diameter of the metal bush and an inner diameter of the resin member are substantially equal,
wherein an outer peripheral surface of the metal bush and an inner peripheral surface of the resin member are not bonded to each other, and
wherein the outer peripheral surface of the metal bush and the inner peripheral surface of the resin member rotatably contact each other.

* * * * *